(12) United States Patent
Almås

(10) Patent No.: US 7,596,765 B2
(45) Date of Patent: Sep. 29, 2009

(54) SOUND FEEDBACK ON MENU NAVIGATION

(75) Inventor: Randi-Lise Hjelmeland Almås, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 434 days.

(21) Appl. No.: 11/535,654

(22) Filed: Sep. 27, 2006

(65) Prior Publication Data

US 2007/0277107 A1 Nov. 29, 2007

Related U.S. Application Data

(60) Provisional application No. 60/747,996, filed on May 23, 2006.

(51) Int. Cl.
*G06F 3/00* (2006.01)
(52) U.S. Cl. ............... 715/854; 715/853; 715/864; 715/865
(58) Field of Classification Search ............... 715/716, 715/727, 764, 810, 823, 835, 841, 853, 854, 715/864, 865; 379/142.17
See application file for complete search history.

(56) References Cited

U.S. PATENT DOCUMENTS

| 6,469,712 B1* | 10/2002 | Hilpert et al. ............... 715/727 |
| 7,190,794 B2* | 3/2007 | Hinde ............... 381/17 |
| 7,318,198 B2* | 1/2008 | Sakayori et al. ............... 715/729 |
| 2002/0054176 A1* | 5/2002 | Ulrich et al. ............... 345/864 |
| 2005/0015254 A1 | 1/2005 | Beaman |
| 2006/0001645 A1* | 1/2006 | Drucker et al. ............... 345/156 |
| 2006/0095846 A1* | 5/2006 | Nurmi ............... 715/701 |
| 2007/0035523 A1* | 2/2007 | Cohen ............... 345/169 |
| 2007/0208687 A1* | 9/2007 | O'Conor et al. ............... 707/1 |
| 2008/0216022 A1* | 9/2008 | Lorch et al. ............... 715/847 |

FOREIGN PATENT DOCUMENTS

| EP | 1 025 683 | 8/2000 |
| WO | WO 2004/044727 | 5/2004 |

OTHER PUBLICATIONS

International Business Machines Corporation: "Position Relative Audio Feedback When Using Graphical User Interface Controls", Research Disclosure, Mason Publications, Hampshire, GB, vol. 424, No. 81, Aug. 1999, XP007124726.
International Search Report and Written Opinion for corresponding PCT Application No. PCT/EP2006/068702, mailed Jun. 21, 2007, 8 pages.

* cited by examiner

*Primary Examiner*—X. L Bautista
(74) *Attorney, Agent, or Firm*—Harrity & Harrity LLP

(57) ABSTRACT

A menu structure in an information presentation device enables navigation in the menu structure. The information presentation device may include a sound generating unit, at least one first user input unit, and a control unit that provides selectable items in the menu structure. The items may be related to functions, applications or settings of the information presentation device. Each item may be associated with at least one dedicated sound. Upon detection of selection of a specific item via a user input unit, the presentation device may control the sound generating unit to generate the sound associated with the selected item.

24 Claims, 3 Drawing Sheets

SOUND FEEDBACK ON MENU NAVIGATION

RELATED APPLICATION

This application claims priority from U.S. Provisional Application 60/747,996, filed May 23, 2006, and titled "Sound Feedback on Menu Navigation," the contents of which are hereby incorporated by reference.

FIELD OF THE INVENTION

The present invention relates generally to information presentation devices and, more particularly, to enabling navigation in a menu structure of an information presentation device.

BACKGROUND OF THE INVENTION

Information presentation devices, such as cellular phones, include a number of different functions and applications. In order to be able to select from among the different functions and applications as well as to be able to set or configure the different functions and applications in relation to the device, the device is normally provided with a menu system, where menu items are provided corresponding to these functions, applications and settings.

In order to navigate between the different items a menu structure is used to organize the items in a logical fashion that makes them easy to locate. Such a menu structure is normally presented to the user of the device in visual form via a display. This puts limitations on the users of such devices. For instance, people that are blind can not easily navigate in the menu structure. Also people that are busy doing other things, such as driving a car, may find it difficult to use the menu system. There are thus a number of situations when it would be advantageous to allow a user to navigate through the items of a menu structure in an information presentation device that is not dependent on the user viewing a display.

SUMMARY OF THE INVENTION

Audible feedback may be provided to a user in the situation where the user is moving or in other situations in which it is not possible or desirable to provide visual information to the user.

According to a first aspect, a method of enabling navigation in a menu structure of an information presentation device comprises providing selectable items in the menu structure, where the selectable items are related to functions, applications or settings of the information presentation device; associating each item with at least one dedicated sound; and upon detecting selection of a specific item in the menu structure, controlling generation of a sound associated with the specific item.

A second aspect is directed to a method including the features of the first aspect, wherein controlling the generation of the sound comprises generating the sound.

A third aspect is directed to the features of the first aspect, further including wherein sound properties of the items are interrelated for indicating the direction of movement or position in the menu structure in relation to selected items in the menu structure.

A fourth aspect is directed to the features of the third aspect, further including wherein the generated sounds are provided with different frequencies for indicating the direction of movement or position in the menu structure in relation to selected items.

A fifth aspect is directed to the features of the third aspect, further including wherein each sound is provided with at least one tone, where a number of tones of each sound is indicative of the direction of movement or position in the menu structure in relation to selected items.

A sixth aspect is directed to the features of the third aspect, further including wherein the sounds are provided as voice that vocalizes the navigation direction or position in the menu structure in relation to selected items.

A seventh aspect is directed towards a method including the features of the third aspect, wherein the sounds are provided as stereo sound.

An eighth aspect is directed towards a method including the features of the first aspect, wherein the structure includes a number of groups of items, where at least one item of one group is linked to a further group of items.

A ninth aspect is directed towards a method including the features of the eighth aspect, wherein the sounds provided for a number of items within a group are sounds providing music of a certain type.

A tenth aspect is directed towards a method including the features of the first aspect, wherein each item is provided with a sound for each direction in which movement can be made in relation to that item.

An object is to provide an information presentation device for enabling navigation in a menu structure, which provides feedback to a user of where in the structure the user is moving when visual information is not possible or desirable to provide to the user.

According to an eleventh aspect, this object is achieved by an information presentation device for enabling navigation in a menu structure. The device comprises at least one first user input unit and a control unit. The control unit is configured to provide selectable items in a menu structure, where the items are related to functions, applications or settings of the information presentation device, and associate each item with at least one dedicated sound and upon detecting an actuation of a specific item via a user input unit, controlling a sound generating unit to generate a sound associated with the specific item.

A twelfth aspect is directed towards a device including the features of the eleventh aspect, wherein the sound generating unit is arranged to generate said sound.

A thirteenth aspect is directed towards a device including the features of the eleventh aspect, wherein sound properties of the items are interrelated for indicating the direction of movement or position in the menu structure in relation to selected items in the menu structure.

A fourteenth aspect is directed towards a device including the features of the thirteenth aspect, wherein the sounds are provided with different frequencies for indicating the direction of movement or position in the menu structure in relation to selected items.

A fifteenth aspect is directed towards a device including the features of the thirteenth aspect, wherein each sound is provided with at least one tone, where the number of tones of each sound is indicative of the direction of movement or position in the menu structure in relation to selected items.

A sixteenth aspect is directed towards a device including the features of the thirteenth aspect, wherein the sounds are provided as voice that vocalizes the navigation direction or position in the menu structure in relation to selected items.

A seventeenth aspect is directed towards a device including the features of the thirteenth aspect, wherein the sounds are provided as stereo sound.

An eighteenth aspect is directed towards a device including the features of the eleventh aspect, wherein said menu structure includes a number of groups of items, where at least one item of one group is linked to a further group of items.

A nineteenth aspect is directed towards a device including the features of the eighteenth aspect, wherein the sounds provided for a number of items within a group are sounds providing music of a certain type.

A twentieth aspect is directed towards a device including the features of the eleventh aspect, wherein each item is provided with one sound for each direction in which movement can be made in relation to that item.

A twenty-first aspect is directed towards a device including the features of the eleventh aspect, wherein the device is a portable electronic device.

A twenty-second aspect is directed towards a device including the features of the twenty-first aspect, wherein the device is a portable communication device.

A twenty-third aspect is directed towards a device including the features of the twenty-second aspect, wherein the device is a cellular phone.

A twenty-fourth aspect is directed towards an information presentation device for enabling navigation in a menu structure. The device comprises means for providing selectable items in the menu structure, where the items are related to functions, applications or settings of the information presentation device; means for associating each item with a dedicated sound; and means for, upon detecting selection of a specific item, causing generation of the sound associated with the specific item.

Another object is to provide a computer program product for enabling navigation in a menu structure, which provides feedback to a user of where in the structure the user is navigating when it is not possible or desirable to visually show the user the menu structure.

According to a twenty-fifth aspect, a computer program product is provided for enabling navigation in a menu structure of an information presentation device. The computer program product includes computer program code to provide selectable items in a menu structure, where the items are related to functions, applications or settings of the information presentation device; computer program code to associate each item with a dedicated sound; and computer program code to, upon detecting selection of a specific item, to control the generation of a sound associated with the specific item.

Various aspects described herein may have the following advantages. It allows a user to directly obtain information relating to the direction in which the user is navigating through the menu structure without having to look at the information presentation device. This is of advantage if the user is blind or occupied with other tasks that do not allow him to look at the device. This may also enable the provision of devices without a display. Furthermore, the aspects described herein may be relatively simple and cheap to implement since much of the functionality needed is already provided in many information presentation devices.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF THE EMBODIMENTS

Figure 1:
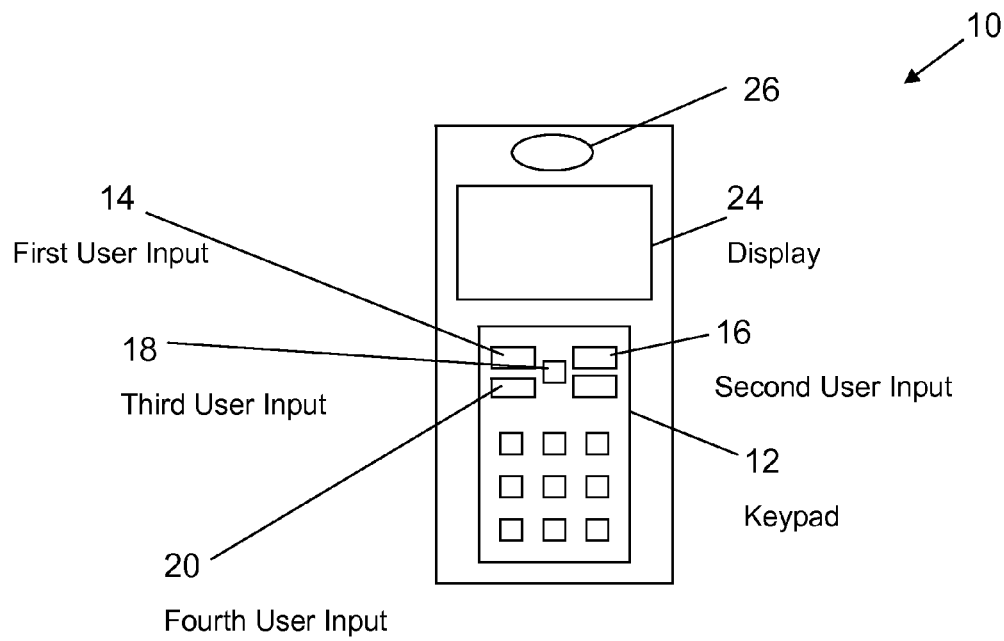
FIG. 1 shows a front view of an exemplary information presentation device in the form of a cellular phone.

An information presentation device 10 is shown in a front view in FIG. 1. In this example, the device is a cellular phone 10 and includes a display 24, a keypad 12 including a number of user input units in the forms of keys, where a first user input unit 14 is a first soft key, a second user input unit 16 is a second soft key, a third user input unit 18 is a joystick that can be moved up, down, to the left and to the right, while a fourth user input unit 20 is a "back key", the function of which will be described in more detail later. Apart from placing and receiving telephone calls, keypad 12 may be used for entering information such as selection of functions and applications and responding to prompts and the display 24 is normally used for displaying functions and prompts to a user of the phone. The first, second, third and fourth user input units 14, 16, 18 and 20 can be used for navigating in a menu system provided in the phone. The phone also includes a sound generating unit in the form of a speaker 26, which is arranged to emit sounds to a user of the phone. A cellular phone is just one example of one portable communication device. A portable communication device is furthermore only one type of portable electronic device. All of these types of devices may present information to a user using a menu structure. Examples of devices to which the concepts described herein may be applied include PDAs (personal digital assistant), palm top computers, lap top computers, smartphones and gaming machines. Additionally, the concepts described herein may also be applied in the context of PCs, TV sets, set top boxes, stereo or video control devices or in any type of device used for presenting a menu structure to a user.

Figure 2:
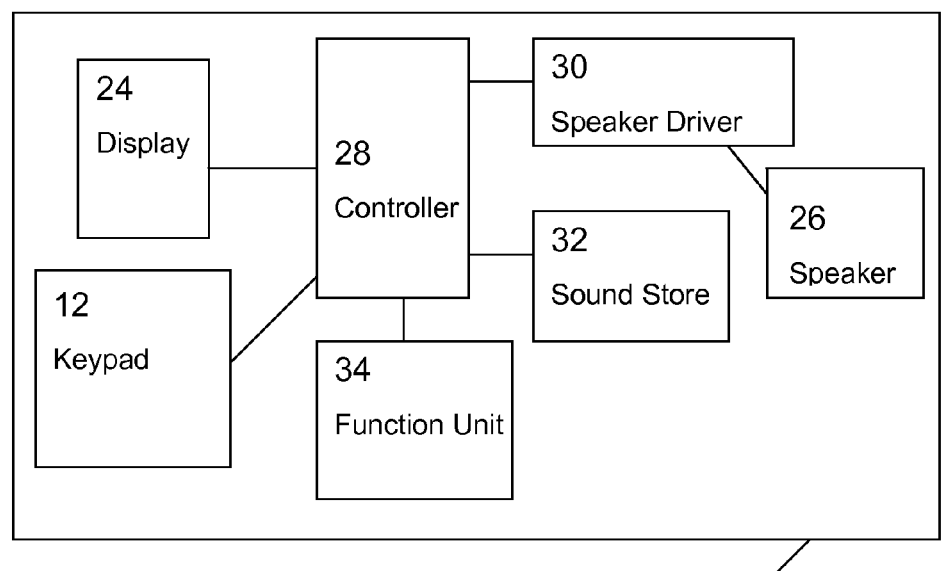
FIG. 2 shows a block schematic of relevant components of the information presentation device shown in FIG. 1.

FIG. 2 shows a block schematic of different components of device 10. Display component 24 and keypad component 12 connect to a control unit 28. Control unit 28 may be connected to a speaker driving unit 30 connected to the speaker 26. Speaker driving unit 30 may drive speaker 26. Device 10 may further include menu item sound store 32 and function unit 34, which represents a function that a user of the phone selects through the menu system. It should be realised that the control unit 28 can be connected to several different function units that provide different functions, applications and settings for the phone. For simplicity, however, one is shown herein.

Figure 3:
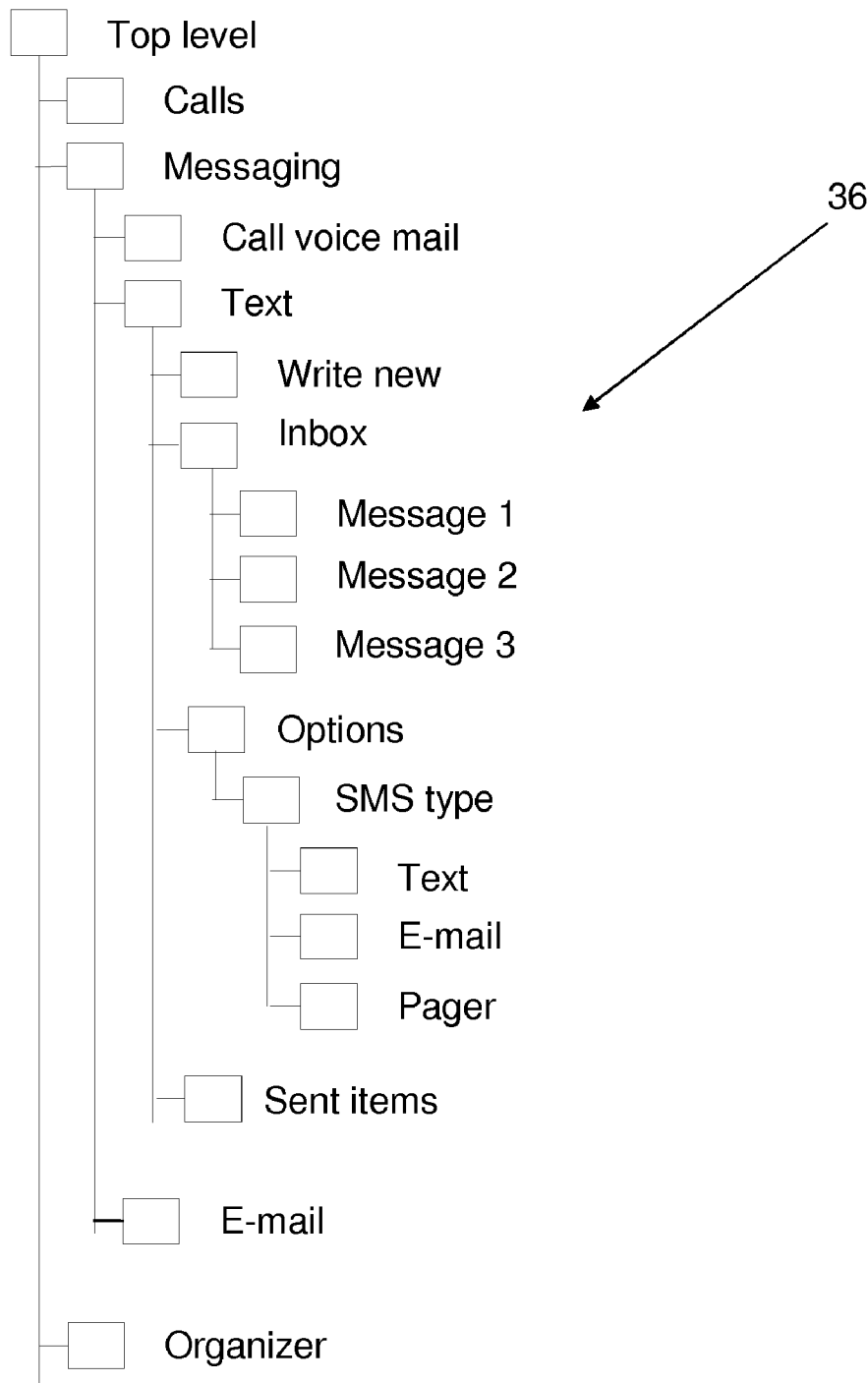
FIG. 3 shows an exemplary structure of a menu system according.

FIG. 3 shows the logical structure 36 of one example of a menu system. Menu system 36 is a hierarchical structure of items that can be selected by a user of the phone. As an example, menu system 36 may include a top level "Top level", which is a normal entry point of the menu system as the phone is turned on. From this top level a first sub level may be reached that includes a number of items that are normally directed towards some general activities of the phone. On this first sub level there are shown the items "Calls", "Messaging" and "Organizer". Various possible settings and functions may be reached through further selections of items in relation to the items of this first sub level. Thus a selection of the item "Calls" allows a user to make calls, look at different types of call logs as well perform different sorts of call management. In the same way it is possible for a user to send, read and write messages via the "Messaging" item and perform clock and calendar settings via the "Organizer" item. It should here also be realised that more or fewer items may be provided on this level of the menu. Some examples of further items on this level may be the menu items "Internet services", "Camera", "Music Player", "Pictures and Sounds", "Games", "Settings" and "Phonebook". However, these additional menu items have here been omitted in order to better explain the present invention. The menu items at a particular menu level of the menu structure may be provided from top to bottom as shown in FIG. 3. It should however be realised that they may also be provided beside each other from left to right or in the form of a matrix. Each item in the first sub level may be selected and then lead to a second sublevel associated with the selected item, where the case of "Messaging" is shown as an example showing the items "Call voice mail", "Text" and "E-mail". It should here be realised that more items may be provided in this second sublevel. Thus a selection of the item "Messaging" will lead to the presenting of the items "Call voice mail", "Text", and "E-mail". The selection of one of the items in the second sublevel may lead to a presentation of items in a third sublevel, if there exist one. For instance the selection of the item "Text" may lead to the presentation of the items "Write new", "Inbox", "Options" and "Sent items". A further selection of the item "Inbox" may then lead to a fourth sublevel including messages "Message 1", "Message 2" and "Message 3", while a selection of the item "Options" may lead to a fourth sublevel including the item "SMS type", which in turn may lead to items "Text", "E-mail" and "Pager" in a fifth sublevel associated with the item "SMS type". The items on a lowest level may not lead to another level, but instead may directly provide a setting, an application or a function of the device. It should be realised that the structure 36 mentioned above is an example of a menu structure in which it is possible to navigate within. Normally when providing feedback to a user of how he is navigating in the structure, this is done through visually highlighting items being marked and displaying a list of further items when a marked item is being selected. The present invention is directed towards providing an alternative to this in that audible feedback is used either in combination with or instead of visual feedback for indicating the direction of the navigation in the structure.

Figure 4:
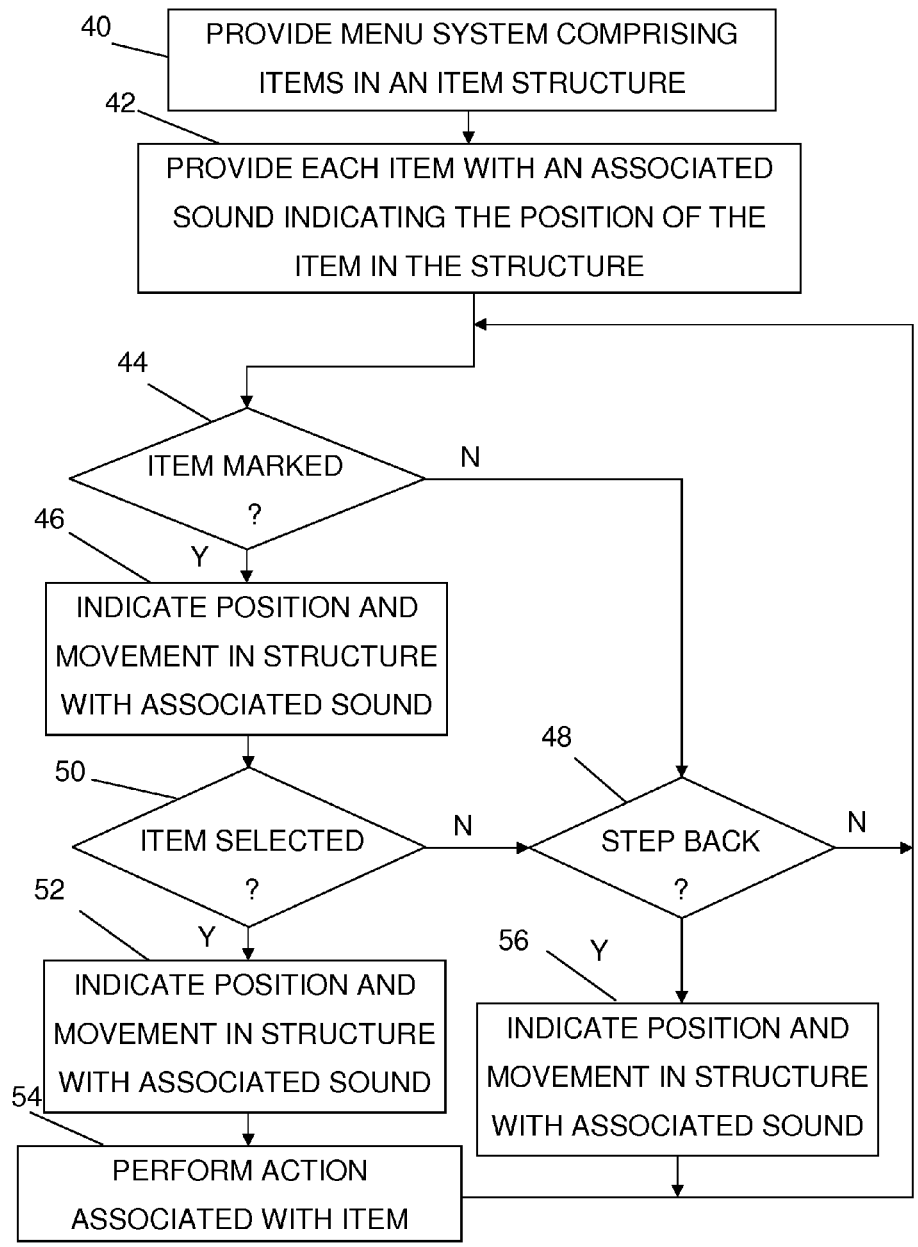
FIG. 4 is flow chart of a method consistent with the present invention.

An embodiment will now be explained with reference to FIGS. 1, 2, 3 and 4, where FIG. 4 shows a flow chart of an exemplary method. This embodiment is also believed to currently embody the best mode. The control unit 28 may associate the items of structure 36 with the user input units of the keypad 12. For example, the first user input unit 14 may allow selections of items in structure 36, the third user input unit 18 may allow scrolling up, down and sideways in the menu structure 36, and the fourth user input unit 20 may cause menu structure 36 to step back in the menu hierarchy. The second user input unit 16 may provide additional information in relation to a marked item. Consistent with aspects of the invention, this additional information may be provided using recorded audio instead of or in addition to displayed information. The method may start with control unit 28 providing the menu system that comprises items in item structure 36, where the structure of FIG. 3 is an example, act 40. Each item is furthermore associated with at least one sound, where a sound indicates the direction of movement of navigation in the structure, act 42. The codes used for generating the sounds may be stored in menu item sound store 32. The control unit 28 thereafter awaits actuation of a user input unit by a user of the device 10 and actuation of either, the first, the third or the fourth user input unit 14, 18 and 20 for navigating in the menu system 36, act 44. If an item is marked, act 44, which may be done by actuating the joystick 18, control unit 28 determines what item is being marked in the structure and then investi- gates what sound is to be emitted through looking in the menu item sound store 32 and providing the speaker driving unit 30 with a sound code from the menu item sound store 32 that is associated with the marked item. It thereafter controls the speaker driving unit 30 to emit a sound associated with the marked item, act 46. This may be done by using audio to provide information indicating movement in the structure, such as, up, down, left or right. In order to determine the direction it is furthermore possible to consider what previous item in the sub level in question was marked. If an item is marked, act 44, the control unit 28 may furthermore determine if the item has been selected, which selection is normally done through actuation of the first soft key 14, act 50. If the item was selected the direction of movement is indicated. For example, the direction of movement may be movement into the interior of the structure 34, for instance, to a lower sub level of the selected item. Control unit 28 may again determine what sound is to be emitted based on store 32 and provides the speaker driving unit 30 with a sound control from the sound store that is associated with the selected item. This may be done by using audio to provide information indicating movement inwards into the structure. Control unit 28 may control speaker driving unit 30 to emit a sound associated with this selected item, act 52. A possible action associated with the item may also be performed, act 54, for instance, via the control unit 28 invoking function unit 34. As an alternative the action may be the selection of a lower order sub level. If an item was not selected, act 50, and if an item was not marked, act 44, control unit 28 may investigate if a step back to previous sub level or the Top level has been selected by the user actuating the "back step" key 20, act 48. In case there was a step back, act 48, the control unit 28 again investigates what sound is to be emitted based on a lookup into store 32 and provides speaker driving unit 30 with a sound control from the sound store that is associated with the step back from the item to the previous or higher order level, act 56. The speaker driving unit 30 then retrieves a sound code from the sound store 32 associated with this back step and may control the speaker 26 generate a sound based on the sound code. This may be done through using audio to provide information indicating movement outwards from the interior of the structure. Thereafter the control unit 28 once again returns and awaits user inputs, act 44.

As described above, based on actions for a menu item, which may be the marking, selection or back step from the item in question, a device provides sounds that provide information on how a user navigates through the menu structure. Each menu item may be generally associated with one sound for each direction movement. The sounds generated may be of various sorts. It is for instance possible to use tones, where a different frequency of a tone signals that an item is above, below or placed beside another item. It is then possible to provide different frequency intervals for different submenus. As an alternative it is possible to use a number of consecutive tones or beeps at the same frequency within a sound, so that one level may have only one tone, the next lower or higher level two tones etc. This may with advantage be combined with using different frequencies. As yet an alternative it is possible to use stereo sound in order to provide information of in which direction a user is moving in the structure when navigating. By driving two speakers so that the sound is perceived as emanating from a certain spot between the speakers and shifting the spot it is then possible to provide the same type of directional information. This later variation can be of particular use when a head set is used. It is furthermore possible to provide spoken information, where a recorded voice can say left, right, up, down, inwards, outwards etc.

Through the techniques discussed above it is possible to provide the menu items in an audio space covering 360 degrees around a user, and the directions associated with the items are provided in this audio space.

According to yet another variation it is also possible to use different types of music for providing directions in the structure, where for instance items on one level are indicated by a certain type of music, like classical music, disco music and rap music and a lower level by different pieces of music within each category.

A number of advantages can be obtained through the concepts described above. A user can directly obtain information relating to the direction in which he is controlling movement through the menu structure without having to look at the information presentation device. This is of advantage if the user is blind or occupied with other tasks that do not allow him to look at the device. This also enables the provision of devices without a display or without a connection to a device presenting the menu structure that does not have a display. The concepts described herein may furthermore be relatively simple and cheap to implement since much of the functionality needed for providing the invention may be provided in many information presentation devices.

Numerous alternatives to the concepts described above are possible. For example, it is possible to indicate the position of an item in addition to or instead of the direction of movement in the structure. It is also possible to provide, in addition to the direction of movement and/or position, the types of items provided in a sub level, for instance by using recorded voice. The menu system may furthermore be provided without the previously described top level, where the items of the first sub level in fact make up the top level instead. It should also be realised that the concepts described herein are not limited to the above described keys, but that any keys of the device may be used. Also, it may be possible to provide visual information of the menu system as well as without providing a visual presenting of the menu system. Additionally, a device may also be provided with its own sound generating unit or to another device having a sound generating unit so that the other device can emit the sounds.

The control unit, function unit and speaker driving unit are normally provided in the form of one or more processors with corresponding program memories containing suitable software code. The menu item store is also preferably provided in the form of a memory, such as a ROM or a RAM memory. The program code mentioned above may also be provided on a data carrier such as a CD ROM disc or a memory stick which performs the method of the present invention when being loaded in an information presentation device. This program code may furthermore be provided on a server and downloaded from there to the information presentation device.

The invention claimed is:

1. A method of enabling navigation in a menu structure of a cellular phone, comprising:
   providing a plurality of selectable menu items in the menu structure, where the selectable items relate to at least one of functions, applications, or settings of the cellular phone;
   associating each of the menu items with at least one dedicated sound;
   identifying, upon detecting selection of a particular one of the menu items in the menu structure, a particular one of the at least one dedicated sound associated with the particular menu item; and
   generating the particular dedicated sound in stereo to perceptively emanate from a spot, between at least two speakers associated with the cellular phone, that is indicative of a direction of movement within the menu structure relative to the particular menu item, without providing visual information related to the direction of movement within the menu structure relative to the particular menu item.

2. The method of claim 1, where controlling the cellular phone does not have a visual display via which to present the menu structure.

3. The method of claim 2, further comprising:
   providing the generated sound to an audio headset as stereo sound in an audio space 360 degrees around a user of the audio headset.

4. The method of claim 2, further comprising:
   shifting the generated sound, from the spot to a different spot between the at least two speakers, based on the direction of movement.

5. The method of claim 1, where sound properties, of the at least one dedicated sound associated with each of the menu items, are interrelated for indicating the direction of movement or position within the menu structure in relation to selected ones of the menu items in the menu structure.

6. The method of claim 5, where the dedicated sounds have different frequencies indicative of the direction of movement or position within the menu structure in relation to the selected menu items.

7. The method of claim 5, where the dedicated sounds are provided with at least one tone, where a number of tones of each dedicated sound is indicative of the direction of movement or position in the menu structure in relation to the selected menu items.

8. The method of claim 5, where the dedicated sounds are provided as voice that vocalizes the direction of movement or position in the menu structure in relation to the selected menu items.

9. The method of claim 1, where the menu structure includes a number of different groups of the menu items, where at least one menu item of one of the groups is linked to another one of the groups of menu items.

10. The method of claim 9, where the dedicated sounds associated with a number of the menu items within a same group are sounds providing music of a particular type.

11. The method of claim 1, where each of the menu items is provided with a sound for each direction in which movement can be made in relation to that menu item.

12. A cellular phone, enabling navigation in a menu structure, comprising:
   at least one first user input unit;
   a sound generating unit; and
   a control unit to:
      provide menu items selectable from the menu structure, where the menu items relate to at least one of functions, applications, or settings of the cellular phone,
      associate at least one dedicated sound to a particular one of the menu items,
      identify, upon detecting selection of the particular menu item via the at least one first user input unit of the cellular phone, the at least one dedicated sound associated with the particular menu item, and
      generate the at least one dedicated sound in stereo to perceptively emanate from a spot, between at least two speakers associated with the cellular phone, that is indicative of a direction of movement within the menu structure relative to the particular menu item, where the at least one dedicated sound is generated independently of visual information related to the direction of movement within the menu structure relative to the particular menu item.

13. The cellular phone of claim 12, where the sound generating unit is arranged to shift the at least one dedicated sound, from the spot to a different spot between the at least two speakers, based on the direction of the movement.

14. The cellular phone of claim 12, where the control unit is to provide the generated at least one dedicated sound to an audio headset as stereo sound in an audio space 360 degrees around a user of the audio headset.

15. The cellular phone of claim 12, where sound properties, of the at least one dedicated sound associated with each of the menu items, are interrelated for indicating the direction of movement or position within the menu structure in relation to selected ones of the menu items in the menu structure.

16. The cellular phone of claim 12, where the dedicated sounds have different frequencies for indicating the direction of movement or position within the menu structure in relation to the selected menu items.

17. The cellular phone of claim 12, where the dedicated sounds are provided with at least one tone, where the number of tones of each dedicated sound is indicative of the direction of movement or position within the menu structure in relation to the selected menu items.

18. The cellular phone of claim 12, where the dedicated sounds are provided as voice that vocalizes the direction of movement or position within the menu structure in relation to the selected menu items.

19. The cellular phone of claim 12, where the menu structure includes a number of different groups of the menu items, where at least one menu item of one of the groups is linked to another one of the groups of menu items.

20. The cellular phone of claim 19, where the dedicated sounds associated with a number of the menu items within a same group are sounds providing music of a particular type.

21. The cellular phone of claim 12, where each of the menu items is provided with one sound for each direction in which movement can be made in relation to that menu item.

22. The cellular phone of claim 12, where the cellular phone does not have a visual display via which to present the menu structure.

23. An information presentation device for enabling navigation in a menu structure, comprising:

means for providing user-selectable items in the menu structure, where the items relate to at least one of functions, applications, or settings of the information presentation device;

means for associating each of the items with a dedicated sound; and means for, upon detecting user selection of a particular one of the items, causing generation of the dedicated sound associated with the particular item in stereo, to perceptively emanate from a spot between at least two speakers associated with the information presentation device, to indicate a direction of movement within the menu structure relative to the particular one of the items, where the information presentation device does not include a visual display via which to present the menu structure or a connection to a device via which to present the menu structure.

24. A computer program product having computer program code stored thereon that when executed by at least one processor, enables navigation in a menu structure of a cellular phone, comprising:

instructions to provide a plurality of menu items in a hierarchical structure, where the plurality of menu items are related to at least one of functions, applications, or settings of the cellular phone;

instructions to associate each of the plurality of menu items with a dedicated sound;

instructions to detect selection of a particular one of the plurality of menu items by actuation of a user input device corresponding to the particular menu item;

instructions to provide, instead of visual feedback, upon the detecting selection of the particular menu item, audio feedback in stereo, including the dedicated sound associated with the particular menu item;

instructions to generate the particular dedicated sound to drive at least two speakers associated with the cellular phone such that the generated sound is perceived as emanating from a first spot between the at least two speakers; and instructions to shift the particular spot to a second spot between the at least two speakers corresponding to a direction of movement within the hierarchical structure relative to the particular menu item.

* * * * *